United States Patent [19]

Jehle et al.

[11] Patent Number: 4,502,957

[45] Date of Patent: Mar. 5, 1985

[54] PROCESS FOR PURIFYING ORGANIC SOLUTIONS

[75] Inventors: Nikolaus Jehle, Pratteln; Markus Thüer; Ewald Losert, both of Rheinfelden, all of Switzerland

[73] Assignee: Ciba-Geigy Corporation, Ardsley, N.Y.

[21] Appl. No.: 441,334

[22] Filed: Nov. 15, 1982

[30] Foreign Application Priority Data

Nov. 24, 1981 [CH] Switzerland .................. 7506/81

[51] Int. Cl.$^3$ ............................................ B01D 15/00
[52] U.S. Cl. ................................................ 210/690
[58] Field of Search .................. 210/690, 694, 908

[56] References Cited

U.S. PATENT DOCUMENTS

| | | | |
|---|---|---|---|
| 2,600,106 | 6/1952 | Garrett | 210/690 |
| 3,956,043 | 5/1976 | Zahir et al. | 156/3 |
| 4,079,041 | 3/1978 | Baumann et al. | 260/630 Y |
| 4,113,837 | 9/1978 | Kendall et al. | 210/702 |
| 4,116,820 | 9/1978 | Blytas | 208/251 R |
| 4,190,576 | 2/1980 | Thomson et al. | 260/122 |
| 4,269,694 | 5/1981 | Holland et al. | 208/48 R |

FOREIGN PATENT DOCUMENTS

| | | |
|---|---|---|
| 42674 | 12/1981 | European Pat. Off. |
| 1300537 | 8/1969 | Fed. Rep. of Germany |
| 2216624 | 10/1972 | Fed. Rep. of Germany |

OTHER PUBLICATIONS

I. Claesson et al., Arkiv Kemi Mineral Geol, A19 (5), (1944).
Kirk-Othmer, Encyclopedia of Chemical Technology, 3rd Ed., vol. 4, John Wiley, New York, 1980, p. 566.
Deitz, Victor R., *Bibliography of Solid Adsorbents 1943 to 1953*, National Bureau of Standards Circular 566, Mar. 1956, Abstract No. 2679, p. 283.
P. Grassmann, "Einführung in die Thermische Verfahrenstechnik", W. D. Gruyter Co., Berlin, 1967, p. 183.

*Primary Examiner*—Ivars Cintins
*Attorney, Agent, or Firm*—Luther A. R. Hall

[57] ABSTRACT

Polymers and, where present, conventional additives, are removed from organic solutions with activated carbon.

13 Claims, No Drawings

PROCESS FOR PURIFYING ORGANIC SOLUTIONS

The present invention relates to a process for removing polymers and, where present, conventional additives for said polymers, from organic solutions by activated carbon adsorption.

Organic solutions which contain polymers often occur in the processing of polymers. This is especially so in the production of printed circuits, where usually the unexposed parts of the light-sensitive layer are developed with organic solvents or with mixtures of solvents.

For economic reasons the solvents are recovered. This can be done simply by distillation. However, distillation has considerable drawbacks. Energy consumption is high and special safety devices are necessary, as the solvents often have to be heated to above their flash point. A resinous coating which prevents heat exchange and therefore has to be removed, deposits onto the heat exchange surfaces. Further, relatively high losses are incurred with distillation. When using solvent mixtures, a change in the mixture ratio occurs and has to be corrected before reuse.

The present invention has for its object to provide a process for removing polymers from organic solutions, which process does not have these drawbacks.

Accordingly, the present invention relates to a process for the removal of polymers and, where present, of conventional additives for said polymers, from organic solutions by adsorption, which process comprises contacting a solution with activated carbon and subsequently isolating the solvent.

The organic solution may contain thermoplasts and duroplasts, e.g.:

1. Polymers, which are derived from hydrocarbons having single or double unsaturation, such as polyolefins, e.g. polyethylene which can be uncrosslinked or crosslinked, polypropylene, polyisobutylene, polymethylbut-1-ene, polymethylpent-1-ene, polybut-1-ene, polyisoprene, polybutadiene, polystyrene, polyisobutylene, copolymers of the monomers based on the above homopolymers, such as ethylene/propylene copolymers, propylene/but-1-ene copolymers, propylene/isobutylene copolymers, and terpolymers of ethylene and propylene with a diene, for example hexadiene, dicyclopentadiene or ethylidene-norbonene; mixtures of the above homopolymers, for example mixtures of polypropylene and polyethylene, polypropylene and polybut-1-ene, propylene and polyisobutylene.

2. Halogen-containing vinyl polymers, such as polyvinyl chloride, polyvinylidene chloride, polyvinyl fluoride, as well as polychloroprene and chlorinated rubbers.

3. Polymers which are derived from $\alpha,\beta$-unsaturated acids and their derivatives, such as polyacrylates and polymethacrylates, polyacrylamides and polyacrylonitrile, as well as their copolymers with other vinyl compounds, such as acrylonitrile/butadiene/styrene, acrylonitrile/styrene and acrylonitrile/styrene/acrylate copolymers.

4. Polymers which are derived from unsaturated alcohols and amines and their acyl derivatives or acetals, such as polyvinyl alcohol, polyvinyl acetate, polyvinyl stearate, polyvinyl benzoate and polyvinyl maleate, polyvinyl butyrat, polyallyl phthalate, polyallyl melamine and their copolymers with other vinyl compounds, such as ethylene/vinyl acetate copolymers.

5. Homo- and copolymers which are derived from epoxides, such as polyethylene oxide or the polymers which are derived from polyglycidyl compounds.

6. Polyacetals such as polyoxymethylene and polyoxyethylene, and those polyoxymethylenes which contain ethylene oxide as comonomer.

7. Polyphenylene oxides.

8. Polyurethanes and polyureas.

9. Polycarbonates.

10. Polysulfones.

11. Polyamides and copolyamides which are derived from diamines and dicarboxylic acids and/or from aminocarboxylic acids or the corresponding lactams, such as polyamide 6, polyamide 6/6, polyamide 6/10, polyamide 11, polyamide 12.

12. Crosslinked polymers which are derived from aldehydes on the one hand and from phenols, ureas and melamines on the other, such as phenol/formaldehyde, urea/formaldehyde and melamine/formaldehyde resins.

13. Alkyd resins, such as glycerol phthalic acid resins and their mixtures with melamine formaldehyde resins.

14. Unsaturated polyester resins, which are derived from copolyesters of unsaturated and unsaturated dicarboxylic acids with polyhydric alcohols, as well as vinyl compounds as crosslinking agents.

15. Natural polymers, such as cellulose, rubber, and their chemically modified homologous compounds, such as cellulose acetates, cellulose propionates and cellulose butyrates, or cellulose ethers such as methyl cellulose.

16. Thermoplastic polyesters, as well as mixtures of the above polymers.

Preferred polymers are epoxy resins and, in particular, light-sensitive photopolymerisable resins. Examples of such polymers are those which contain a 1,2-substituted maleimidyl group. Such polymers are described e.g. in German Offenlegungsschrift 26 26 769. A further group comprises e.g. light-sensitive epoxy resins, in particular those which contain chalcone groups and are used in general together with a hardener and/or hardening accelerator. Such polymers are described e.g. in German Offenlegungsschrift 23 42 407. A representative example is (4,4'-glycidoxyphenyl)vinyl ketone, which may be used by itself, together with other epoxy resins, or as prereacted epoxy resin. Also suitable are homopolymers and copolymers which contain cinnamic acid radicals. A further group of photopolymerisable compounds comprises acrylates and/or methacrylates and homopolymers and copolymers thereof having a low degree of polymerisation. A further known group comprises cyclised rubber photoresists, e.g. of cis-1,4-polyisoprene.

The molecular weight of the polymers is preferably at least 300, most preferably at least 1000. An upper limit is determined by the solubility of the respective polymers in organic solvents. The molecular weight may be up to 1,000,000, preferably up to 500,000. A preferred range is that from 1000 to 500,000, with the most preferred range being from 1000 to 50,000.

Suitable solvents for the polymers, which solvents may be used alone or in mixtures, are e.g.: ketones such as dimethyl ketone, diethyl ketone, methyl isobutyl ketone, cyclohexanone, cyclopentanone, cycloheptanone, isophorone, methoxyhexanone, acetonylacetone, acetophenone, benzyl ethyl ketone, 3,3,5-trimethylcyclohexanone, mesityl oxide; halogenated hydrocarbons such as carbon tetrachloride, chloroform, methylene chloride, methylene bromide, bromochloromethane, 1,2-dichloroethane, 1,1,2-trichloroethane, 1,1,2,2-tetrachloroethane, 1,2,3-trichloropropane, perchloroethylene; alcohols such as methanol, ethanol, propanol, butanol, hexanol, cyclohexanol, furfuryl alcohol, tetrahydrofurfuryl alcohol, benzyl alcohol, monoalkylated glycols such as methyl glycol, ethyl glycol, methyl diglycol, ethyl diglycol, butyl diglycol, triethylene glycol monomethyl, monoethyl or monobutyl ether, glycols such as ethylene glycol, propylene glycol or butylene glycol and their oligomers such as triethylene glycol; aliphatic and aromatic hydrocarbons such as pentane, hexane, cyclohexane, methylcyclohexane, benzene, toluene or xylene; ethers such as diethyl ether, dibutyl ether, tetrahydrofuran, dioxan, ethylene glycol dimethyl ether, diethylene glycol dimethyl ether; carboxylic acid esters such as methyl acetate, ethyl acetate, propyl acetate, butyl acetate and isopropyl acetate, methyl propionate, butyl glycolate, methyl benzoate, ethyl glycol mono- or diacetate, methyl or ethyl glycol acetate; lactones such as butyrolactone or valerolactone; acid amides such as dimethylformamide, dimethylacetamide, hexamethylphosphoric triamide; sulfones such as dimethylsulfone, dibutylsulfone or tetramethylsulfone.

The solution may contain further conventional additives for polymers, e.g. extenders, plasticisers, wetting agents, dyes, pigments, stabilisers, flame retardants, photosensitisers or photoactivators, hardeners and hardening accelerators.

The solution may contain about 0.1 to 300 g, preferably 1 to 150 g, of polymer and, as the case may be, of conventional additives, per liter of solvent. A concentration of 1 to 50 g/l of solvent has proved particularly advantageous.

The activated carbon may be in powder form or granulated. Advantageously it has a low content of ash in order to avoid large amounts of residue when the spent activated carbon is incinerated. The pores of the activated carbon may have a diameter of about 5 to 2000 Å. It is preferred to use those activated carbons whose pores have substantially a diameter of 25 to 500 Å. Such activated carbons are commercially available. The amount of activated carbon depends essentially on the amount of dissolved polymer and, if present, of additives. The amount of activated carbon employed may be 10 to 500 g per liter of solvent.

The contact time is preferably at least 30 minutes and, most preferably, at least 1 hour. Depending on the amount of polymer to be removed from the solution, the contact time may be 40 hours and longer.

The process of this invention can be carried out at room temperature. Surprisingly, it has been found that a substantially higher loading of the activated carbon can be effected at higher temperatures. Higher temperatures are chosen such that they lie below the boiling temperature and advantageously e.g. below the flash point of the solvent. A preferred temperature range is from 20° to 150° C., especially from 20° to 100° C.

In one embodiment of the invention, activated carbon in powder form is preferably used and the treatment of the organic solution is carried out in an agitator vessel (batch process), a close contact being brought about by vigorous stirring. The purified solvent can then be obtained by removing the loaded activated carbon, e.g. by filtration, centrifuging or decantation. The batch process may be carried out in one or more steps, in the last mentioned case using vessels connected in series.

In another embodiment, the process of the invention may also be carried out continuously, preferably using granulated activated carbon in order to prevent the columns from becoming clogged. This process is carried out by packing the columns with activated carbon and passing the solution slowly through the packed columns in order to ensure an adequate contact time. In this procedure too, several columns can be connected in series. The columns may be operated as solid bed or sliding bed and, if desired, also as fluidised bed.

By means of the process of this invention, polymers can be removed in simple manner from organic solutions and the solvent can be recovered. Energy consumption is low and it is not necessary to heat the solution above the flash point of the solvent. No change in the mixture ratio of solvent mixtures is observed. It is surprising that the dissolved polymers are adsorbed in preference to the solvents and that simultaneously conventional additives, e.g. dyes or hardeners, are also removed. Depending on the end use, an extensive or almost complete removal of polymers can be effected. Extensive removal suffices when the polymers are dissolved in solvents which act as developers. The spent activated carbon can be simply disposed of by incineration.

The following Examples illustrate the invention in more detail.

EXAMPLE 1:

50 g of photopolymer resin (bisphenol A type resin which contains chalcone groups) and 6 g of bisguanide hardener are dissolved in 2544 g of a mixture of 50 parts by weight of propylene carbonate, 30 parts by weight of diethylene glycol mono-n-butyl ether and 20 parts by weight of γ-butyrolactone. This solution has a solids content of 11.3 g/l. To 100 ml of this solution are added 10 g of activated carbon (registered trademark Carboraffin C) and contact is maintained for 1 hour at 28°–30° C. by vigorous stirring. The activated carbon is then removed by filtration. The filtrate has a solids content of 0.4 g/l.

EXAMPLE 2:

An adsorption system comprising 5 glass columns having an internal diameter of 2 cm and an effective length of 145 cm is connected in series. Each column is packed with 200 g of granulated activated carbon (BPL 12×30). A solution of 100 g of resin and 12 g of hardener (as in Example 1) in 5088 g of the solvent mixture described in Example 1 is passed through the system. The regulated flow is 1 ml/min, resulting in a contact time of about 37 hours. A total amount of about 2300 g of solution is passed through the system. The solids content of the solution is determined at the exit of the system. It is 0.22 g/liter.

EXAMPLE 3:

Glass columns of 20 mm diameter and 1 meter long are connected in series to form an adsorption system and are packed with granulated activated carbon (Chemviron F400, granulation 12×40). A solution as described in Example 1 having a solids content of 5 g/l is used. This solution is pumped into the columns so as to give a contact time of 3 hours per column. The columns are kept at a constant temperature of 22° C. The amount of solvent which can be passed through the carbon until there is a breakthrough of the bed is determined, i.e. until the concentration at the exit of the adsorber column is half the initial concentration. The consumption of carbon is 167 g/l of solvent mixture.

EXAMPLE 4:

The experimental procedure of Example 3 is repeated. The temperature is adjusted to 70° C. The carbon consumption is 67 g of carbon per liter of solvent.

EXAMPLE 5:

The experimental procedure of Example 3 is repeated. At an adsorption temperature of 120° C., the carbon consumption is 40 g of carbon per liter of solvent.

It is evident from Examples 3 to 5 that a substantially lower consumption of carbon results with increasing temperature.

EXAMPLE 6:

A cylindrical reaction vessel (about 700 l capacity) is charged with granulated activated carbon (registered trademark Chemviron F400). The reactor is equipped with a conveyor system for the supply of fresh and for the removal of spent activated carbon. A circulating system passes 100 l/h of resin solution of Example 1 through the reactor, which is heated externally to 80° C. The contact time is about 6 hours. Whenever a concentration of 500 mg/l in the regenerated solution is exceeded, a portion of the spent carbon is replaced by fresh carbon. 6000 liters of solution having an average concentration of 6.2 g/l of photopolymer resin and hardener are passed through the adsorber system. The regenerated solution has an average concentration of 80 mg/l. The consumption of carbon is 390 kg. About 90 g of resin and hardener are adsorbed with 1 kg of carbon and 11 to 12 liters of solvent mixture are recovered. Gas chromatographic analysis shows that the percentage composition of the solvent mixture remains the same.

EXAMPLES 7 to 10:

100 ml of polymer solution are treated with the respective amount of activated carbon (Chemviron F400) indicated in the following table and stirred for 24 hours at 17° C. or 75° C. The activated carbon is then removed by filtration and the residual concentration of the polymer in the solution is determined. The results are reported in the table.

What is claimed is:

1. A process for the removal of a photopolymerisable resin polymer or a photopolymerisable resin polymer and additives for said polymer from a solution of said polymer or polymer and additives in an organic solvent by adsorption, wherein the polymer has a molecular weight in the range of 1000 to 500,000 and the solution contains from 1 to 150 g of polymer per liter of solvent, which comprises
bringing the solution at 20° to 150° C. into contact with 10 to 500 g of activated carbon per liter of solvent,
adsorbing the polymer or polymer and additives onto the carbon and,
subsequently isolating the solvent.

2. A process according to claim 1, wherein the contact time is at least 30 minutes.

3. A process according to claim 1, which is carried out at below the boiling temperature of the solution.

4. A process according to claim 3 which is carried out at a temperature below the flash point of the solvent.

5. A process according to claim 1, which is carried out as batch process with powdered activated charcoal.

6. A process according to claim 1, which is carried out as continuous process with granulated activated carbon.

7. A process according to claim 1, wherein the photopolymerisable resin contains a 1,2-substituted maleimidyl group.

8. A process according to claim 1, wherein the photopolymerisable resin is a light-sensitive epoxy resin.

9. A process according to claim 8, wherein the photopolymerisable resin contains chalcone groups.

10. A process according to claim 1, wherein the photopolymerisable resin contains cinnamic acid radicals.

11. A process according to claim 1, wherein the photopolymerisable resin comprises acrylates, methacrylates or mixtures thereof, and homopolymers and copolymers thereof having a low degree of polymerisation.

12. A process according to claim 1, wherein the photopolymerisable resin comprises cyclized rubber photoresists.

13. A process according to claim 1, wherein the solution contains from 1 to 50 g of polymer per liter of solvent.

* * * * *

TABLE

| Polymer solution | Treatment temperature | Amount of activated carbon per polymer solution g/100 ml | Concentration of the polymer solution mg/polymer/liter of solution | | Adsorbed polymer g/kg of carbon |
|---|---|---|---|---|---|
| | | | before treatment | after treatment | |
| polyaminoamide resin (Versamid 100, Schering AG) dissolved in methyl glycol | 17° C. | 3 | 2800 | 0 | 93 |
| | 75° C. | 3 | 9800 | 100 | 112 |
| polybutadiene resin Poly Pd R 45 HT (Metallgesellschaft AG, Frankfurt) dissolved in cyclohexanone | 17° C. | 6 | 9800 | 0 | 163 |
| | 75° C. | 5 | 9500 | 1150 | 167 |
| high molecular epoxy resin (Phenoxy PKHH, Union Carbide Corp.) dissolved in ethyl glycol acetate | 17° C. | 6 | 9950 | 4400 | 92 |
| | 75° C. | 6 | 9550 | 1500 | 134 |
| PVC-PVAc copolymer (Vinilyth VAGH, Union Carbide Corp.) dissolved in γ-butyrolactone | 17° C. | 6 | 7350 | 5400 | 32 |
| | 75° C. | 6 | 6850 | 3350 | 58 |